(12) United States Patent
Parkin et al.

(10) Patent No.: US 12,528,491 B2
(45) Date of Patent: Jan. 20, 2026

(54) BLIND SPOT DETECTION CONTROL APPARATUS AND METHOD

(71) Applicants: AUMOVIO Autonomous Mobility Germany GmbH, Ingolstadt (DE); TOYOTA JIDOSHA KABUSHIKI KAISHA, Toyota (JP)

(72) Inventors: Dan Parkin, Singapore (SG); Hyungjun Kim, Singapore (SG); Hiroki Shimazu, Toyota (JP); Junya Fukuta, Toyota (JP); Koji Takeuchi, Toyota (JP)

(73) Assignees: AUMOVIO Autonomous Mobility Germany GmbH, Ingolstadt (DE); TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 18/483,999

(22) Filed: Oct. 10, 2023

(65) Prior Publication Data

US 2024/0132095 A1 Apr. 25, 2024
US 2024/0227840 A9 Jul. 11, 2024

(30) Foreign Application Priority Data

Oct. 19, 2022 (EP) .................................. 22202601

(51) Int. Cl.
*B60Q 1/00* (2006.01)
*B60W 50/14* (2020.01)
(Continued)

(52) U.S. Cl.
CPC ........... *B60W 50/14* (2013.01); *G01S 13/931* (2013.01); *B60W 2050/0083* (2013.01);
(Continued)

(58) Field of Classification Search
CPC ......... B60W 50/14; B60W 2050/0083; B60W 2050/143; B60W 2420/408;
(Continued)

(56) References Cited

U.S. PATENT DOCUMENTS

| 5,325,096 | A | * | 6/1994 | Pakett | .................. G01S 13/931 342/70 |
| 6,838,981 | B2 | * | 1/2005 | Zoratti | .................. G08G 1/166 340/436 |
| 8,842,176 | B2 | * | 9/2014 | Schofield | .................. B60R 1/30 348/113 |

(Continued)

FOREIGN PATENT DOCUMENTS

| JP | 2007-233864 A | 9/2007 |
| JP | 2009-211557 A | 9/2009 |

(Continued)

OTHER PUBLICATIONS

Communication issued Dec. 3, 2024 in Japanese Application No. 2023-175410.

*Primary Examiner* — Tai T Nguyen
(74) *Attorney, Agent, or Firm* — Sughrue Mion, PLLC (57) ABSTRACT

A blind spot detection control apparatus for a vehicle, configured for judging whether an object detected during a detection cycle in blind spot zone of the vehicle is an alert object, for outputting a result of judgement to a warning which warns a driver of vehicle that an object is present in blind spot zone based on judging that object detected in blind spot zone is an alert object, wherein apparatus is configured to judge whether an object detected in blind spot zone is an alert object by comparing detection parameters relating to a current target object detected in blind spot zone during a current detection cycle with detection parameters relating to a reference moving object corresponding to a target object detected in blind spot zone at least during a previous detection cycle.

10 Claims, 6 Drawing Sheets

(51) Int. Cl.
*G01S 13/931* (2020.01)
*B60W 50/00* (2006.01)

(52) U.S. Cl.
CPC .............. *B60W 2050/143* (2013.01); *B60W 2420/408* (2024.01); *B60W 2554/4041* (2020.02); *B60W 2556/10* (2020.02); *G01S 2013/9315* (2020.01)

(58) Field of Classification Search
CPC ..... B60W 2554/4041; B60W 2556/10; B60W 2554/802; B60W 2554/803; G01S 13/931; G01S 2013/9315
USPC ...................................................... 340/425.5
See application file for complete search history.

(56) References Cited

U.S. PATENT DOCUMENTS

| | | |
|---|---|---|
| 2011/0128138 A1 | 6/2011 | Yamamoto et al. |
| 2015/0097702 A1* | 4/2015 | Kim ................... G01S 13/931 340/901 |
| 2017/0329001 A1* | 11/2017 | Brandt ................ G06V 20/58 |
| 2018/0102055 A1 | 4/2018 | Lim et al. |
| 2018/0354510 A1 | 12/2018 | Miyata |
| 2020/0211398 A1 | 7/2020 | Baumann et al. |

FOREIGN PATENT DOCUMENTS

| | | |
|---|---|---|
| JP | 2009-231938 A | 10/2009 |
| JP | 2018-101295 A | 6/2018 |

\* cited by examiner

BLIND SPOT DETECTION CONTROL APPARATUS AND METHOD

The invention relates to a blind spot detection control apparatus and method for a vehicle. Furthermore, the invention relates to driver assistance system for a vehicle, comprising such a blind spot detection control apparatus, a corresponding computer program for carrying out the blind spot detection method and a respective computer-readable medium.

Conventional Driver Assistance Systems or Advanced Driver Assistance Systems (ADAS) for vehicles are widely used, for example, in connection with conventional vehicles as well as autonomous vehicles.

Many vehicle accidents are caused by human error, which might have been avoided by means of such Advanced Driver Assistance Systems (ADAS). Commonly known safety-critical ADAS applications include pedestrian detection/avoidance, lane departure warning/correction, traffic sign recognition, automatic emergency braking and blind spot detection, for example. Long range radars are usually used for applications like emergency brake assist and adaptive cruise control, while short-range-radars are often employed in connection with applications like blind spot detection (BSD), rear-cross-traffic-alert and lane-change-assist.

In respect of blind spot detection, multiple vision-based algorithms are used in order to assist a vehicle's driver in monitoring the so-called blind spot which is an area around the vehicle that cannot be directly seen by the driver while at the controls.

In other words, blind spots are the areas of the road that cannot be seen while looking forward or through either the rear-view or side mirrors (expecting that the side mirrors are properly adjusted on the vehicle). The most common are the rear quarter blind spots, areas towards the rear of the vehicle on both sides. Vehicles in the adjacent lanes of the road that fall into these blind spots may not be visible using only the car's mirrors.

Commonly known blind spot detection systems use sensors to provide drivers with important information that is otherwise difficult or impossible to obtain. For example, short-range-radar sensors or camera sensors may be used in connection with blind spot detection systems. Some systems sound an alarm when they detect an object in the driver's blind spot, such as when the driver tries to move into an occupied lane. Blind spot detection systems can monitor this area. Sensors monitor the road area behind and next to the subject/ego vehicle and warn if it is tried to pull out despite there being no gap or being an object like another vehicle.

Accordingly, the function of BSD systems is to alert the driver when a moving object like another vehicle is inside the BSD zone/area but in some cases, when the moving object inside the BSD zone travels at a similar velocity to the ego/subject vehicle (where the BSD system is arranged), it is sometimes mistaken for a static object, and then an alert is wrongly stopped due to this misdetection.

SUMMARY OF THE INVENTION

A blind spot detection control apparatus according to the present invention is for using with a vehicle and comprises judging means for judging whether an object detected during a detection cycle in a blind spot zone of the (ego/subject) vehicle is an alert object, and for outputting a result of judgement to warning means which warns a driver of the (ego/subject) vehicle that an object is present in the blind spot zone based on the judging means judging that the object detected in the blind spot zone is an alert object, wherein the judging means is configured to judge whether an object detected in the blind spot zone is an alert object by comparing detection parameters relating to a current target object detected in the blind spot zone during a current detection cycle with detection parameters relating to a reference moving object corresponding to a target object detected in the blind spot zone at least during a previous detection cycle.

By means of the blind spot detection control apparatus according to the present invention, it can be continued to output a blind spot detection warning even if the object detected exits/exited the blind spot detection zone, if the object is judged to be an alert target. This is because, if a target object is judged to be an alert target, a timer is set and a warning will be output as long as a certain period of time has elapsed.

For example, a target object can be judged to be an alert object if its position and velocity are similar to those of the reference moving object, i.e. by comparison of the detection parameters of the currently detected object with those of the reference moving object. Thus, even if the currently detected target object might be judged to be a stationary object at first, if its position and velocity are similar to those of the reference moving object, it is nevertheless judged to be an alert target.

In other words: If a target object is judged to be an alert object, for example, if a target object detected in the blind spot zone/area at least during a previous detection cycle is set to a reference moving object, the reference moving object is retained for a certain period of time even if it exited the blind spot detection zone. The reference movement object is only initialized/deleted after the certain period of time has elapsed. As long as the reference moving object is retained and a (new or same) target object similar to the reference moving object is found, a blind spot detection warning will be continued to be output.

With respect to setting and updating the reference moving object, if the blind spot detection warning is triggered correctly at first, the currently detected target object is set as the reference moving object. Within a certain time period after the reference moving object disappears or leaves the blind spot detection zone, if there remains an identified or detected alert target similar to the set reference moving object, that target object can be set as a new reference moving object, or if not, the reference moving object can be initialized, i.e. can be erased. By means of this, a warning in the form of an alarm can be continuously output even in a problem situation. Accordingly, one of the advantageous effects achieved by the invention is to avoid misdetections, for example.

The blind spot detection control apparatus according to the present invention can be further configured in such a way that the judging means is configured to compare the detection parameters relating to the current target object with the detection parameters relating to the reference moving object on the basis of a difference of position coordinates, with respect to the (ego/subject) vehicle, of the target object and the reference moving object and/or a difference of relative velocities, with respect to the (ego/subject) vehicle, of the target object and the reference moving object.

Moreover, the blind spot detection control apparatus according to the present invention may be implemented in such a way that the judging means is configured to judge the current target object to be an alert object based on the comparison of the detection parameters relating to the current target object with the detection parameters relating to the reference moving object satisfying one or more predetermined conditions with respect to the position coordinates and/or relative velocities.

In this connection, the blind spot detection control apparatus according to the present invention may be realized in such a way that the judging means is configured to judge the current target object to be an alert object based on the following conditions being satisfied:

$Abs(DistX-DistX_{ref})<DistX\_Thresh$,
$Abs(DistY-DistY_{ref})<DistY\_Thresh$,
$Abs(VrelX-VrelX_{ref})<VrelX\_Thresh$,
$Abs(VrelY-VrelY_{ref})<VrelY\_Thresh$, where
- DistX is X position of the target object with respect to the (ego/subject) vehicle,
- DistY is Y position of the target object with respect to the (ego/subject) vehicle,
- $DistX_{ref}$ is X position of the reference moving object with respect to the (ego/subject) vehicle,
- $DistY_{ref}$ is Y position of the reference moving object with respect to the (ego/subject) vehicle,
- VrelX is X relative velocity of the target object with respect to (ego/subject) vehicle,
- VrelY is Y relative velocity of the target object with respect to (ego/subject) vehicle,
- VrelX ref is X relative velocity of the reference moving object with respect to (ego/subject) vehicle,
- $VrelY_{ref}$ is Y relative velocity of the reference moving object with respect to (ego/subject) vehicle,
- DistX_Thresh is threshold value for X position difference,
- DistY_Thresh is threshold value for Y position difference,
- VrelX_Thresh is threshold value for X velocity difference,
- VrelY_Thresh is threshold value for Y velocity difference.

Furthermore, the blind spot detection control apparatus according to the present invention may further comprise reference moving object setting/updating means configured to
- set a current target object detected during a current detection cycle in the blind spot zone to be the reference moving object based on no reference moving object being presently set and a trigger for causing the warning means to warn the driver of presence of an object in the blind spot zone being set, and/or
- set a current target object detected in the blind spot zone in a current detection cycle to be the reference moving object based on the reference moving object being presently set but being not detected in the blind spot detection zone and the current target object having been judged to be an alert object in a previous detection cycle, and/or
- initialize/erase the setting of the reference moving object based on the reference moving object being presently not detected in the blind spot detection zone, no current target object having been judged to be an alert object in a previous detection cycle and a difference between the current time and the time when the reference moving object was detected to have left the blind spot detection zone exceeding a predetermined threshold value.

Additionally, the blind spot detection control apparatus according to the present invention may be further configured in such a way that the reference moving object setting/updating means is configured to maintain the set reference moving object based on the reference moving object being presently not detected in the blind spot detection zone, no current target object having been judged to be an alert object in a previous detection cycle and the difference between the current time and the time when the reference moving object was detected to have left the blind spot detection zone being smaller than the predetermined threshold value. That is, even if the reference moving object left the BSD zone, the reference moving object is not immediately erased. Only after a certain time has elapsed, the reference moving object still outside the BSD zone is erased. Otherwise, if the reference moving object is still set because the specified time has not yet elapsed, a target object whose detection parameters are similar to those of the reference moving object that is still set may be detected to be an alert object, which might have been detected as a stationary object without the comparison with the parameters of the set reference moving object, which can be prevented by the invention.

A driver assistance system for a vehicle according to the present invention may comprise detecting means for detecting an object in a blind spot zone of the vehicle during a detection cycle, the blind spot detection apparatus according to the present invention and warning means for warning a driver of the vehicle that an object is present in the blind spot zone based on the judging means of the blind spot detection apparatus judging that the object detected in the blind spot zone is an alert object. The detecting means may comprise sensors like radar sensors, for example, short-range-radar sensors, and/or camera sensors/image sensors, which are used separately or in combination for detecting an object in the blind spot zone/area. For example, the driver assistance system may be part of an Advanced Driver Assistance System (ADAS), or in particular of a Rear Cross Traffic Alert (RCTA) system.

The driver assistance system according to the present invention may be further configured in such a way that the warning means is configured to warn a driver of the vehicle that an object is present in the blind spot zone based on the judging means judging that the object detected in the blind spot zone is an alert object and/or keeps a warning to be turned on/maintained as long as a timer T exceeds 0, wherein the timer T is updated on the basis of the following function:

$$T=MIN(T_{MAX},MAX(T,TTC))-T_{cycle}$$

where:
- TTC is the time until alert object exits warning zone
- T is the timer length,
- $T_{MAX}$ is the maximum threshold for timer length, and
- $T_{cycle}$ is the time length of a detection cycle.

If no alert object is detected (if flag_NotStatic=False), the timer T is deducted by the time length of a process cycle, i.e. according to the following equation: $T=T-T_{cycle}$. In this case, irrespective of whether the conventional warning process might have set a warning to be turned on or off, the warning means either sets the warning to be turned on again or keeps the warning to be turned on as long as the timer T exceeds 0.

Regarding the function $T=MIN(T_{MAX}, MAX(T, TTC))-T_{cycle}$, the following applies:
- Step 1: MAX(T, TTC) will return T if T>TTC and return TTC if T<TTC. As a consequence of this, the timer will be prolonged if a longer TTC is detected;
- Step 2: $T=MIN(T_{max}, MAX(T, TTC))$ will return $T_{max}$ if $T_{max}<MAX(T, TTC)$ and return MAX(T, TTC) if $T_{max}>MAX(T, TTC)$. Accordingly, the timer length is kept shorter than $T_{max}$, which is to reduce the risk of long False BSD warnings.
- Step 3: $T=T-T_{cycle}$ will be calculated, so that the timer will act as a timer. This calculation will be executed regardless of the fact whether an alert target has been detected or not (regardless of the setting of the "flag_NotStatic==False" or "flag_NotStatic==True").

A computer-implemented method for controlling blind spot detection of a vehicle according to the present invention comprises the following steps:

judging whether an object detected during a detection cycle in a blind spot zone of the vehicle is an alert object, and outputting a result of judgement for warning a driver of the vehicle that an object is present in the blind spot zone based on judging that the object detected in the blind spot zone is an alert object, wherein it is judged whether an object detected in the blind spot zone is an alert object by comparing detection parameters relating to a current target object detected in the blind spot zone during a current detection cycle with detection parameters relating to a reference moving object corresponding to a target object detected in the blind spot zone at least during a previous detection cycle.

Accordingly, the properties and advantages explained in connection with the blind spot detection control apparatus according to the invention arise in the same or similar manner in respect of the method for controlling blind spot detection of a vehicle according to the present invention, which is why, in order to avoid repetitions, reference is made to the respective explanations with respect to the blind spot detection control apparatus according to the invention.

A computer program according to the present invention comprises instructions which, when the program is executed by a computer, cause the computer to carry out the computer-implemented method according to the present invention.

A computer-readable medium according to the present invention has stored thereon the computer program according to the invention.

BRIEF DESCRIPTION OF THE DRAWINGS

Preferred embodiments and advantages of the invention will become more apparent upon reading the following detailed description along with the accompanying drawings in which.

DETAILED DESCRIPTION

With reference to the drawings, one preferred embodiment of the present invention will now be specifically described for illustrative purposes. It is to be understood that components or elements in this embodiment will be shown and described by way of examples only, but are not intended to limit this invention to them.

Figure 4:
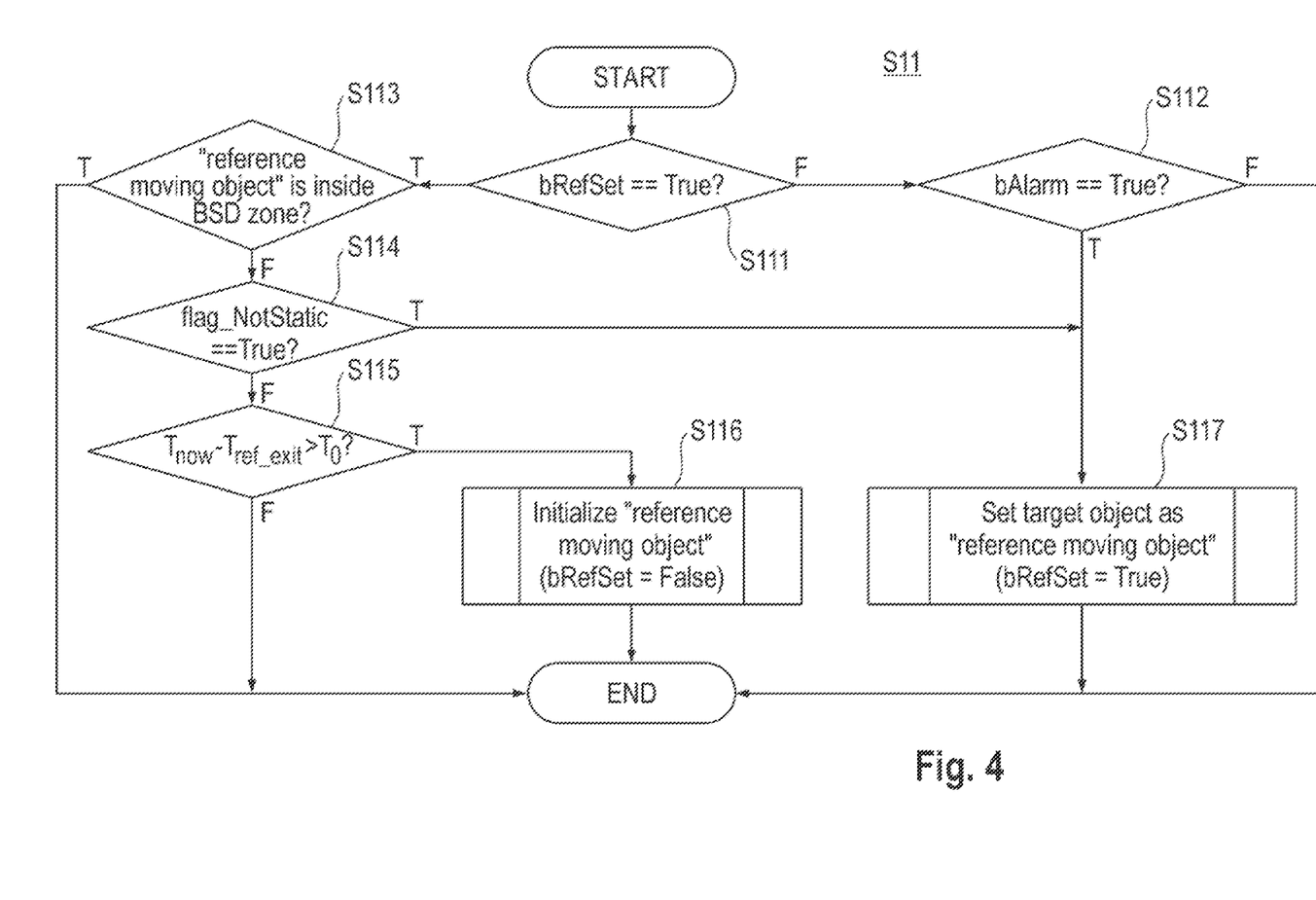
FIG. 4 shows a flowchart of reference moving object setting/updating process carried out by the alert target judging process of FIG. 2.
Figure 5:
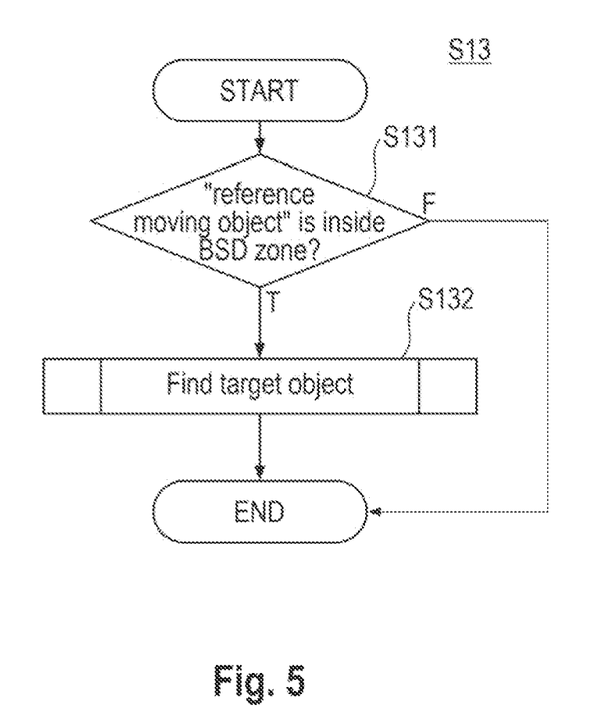
FIG. 5 shows a flowchart of a target object finding process carried out by the alert target judging process of FIG. 2.
Figure 6:
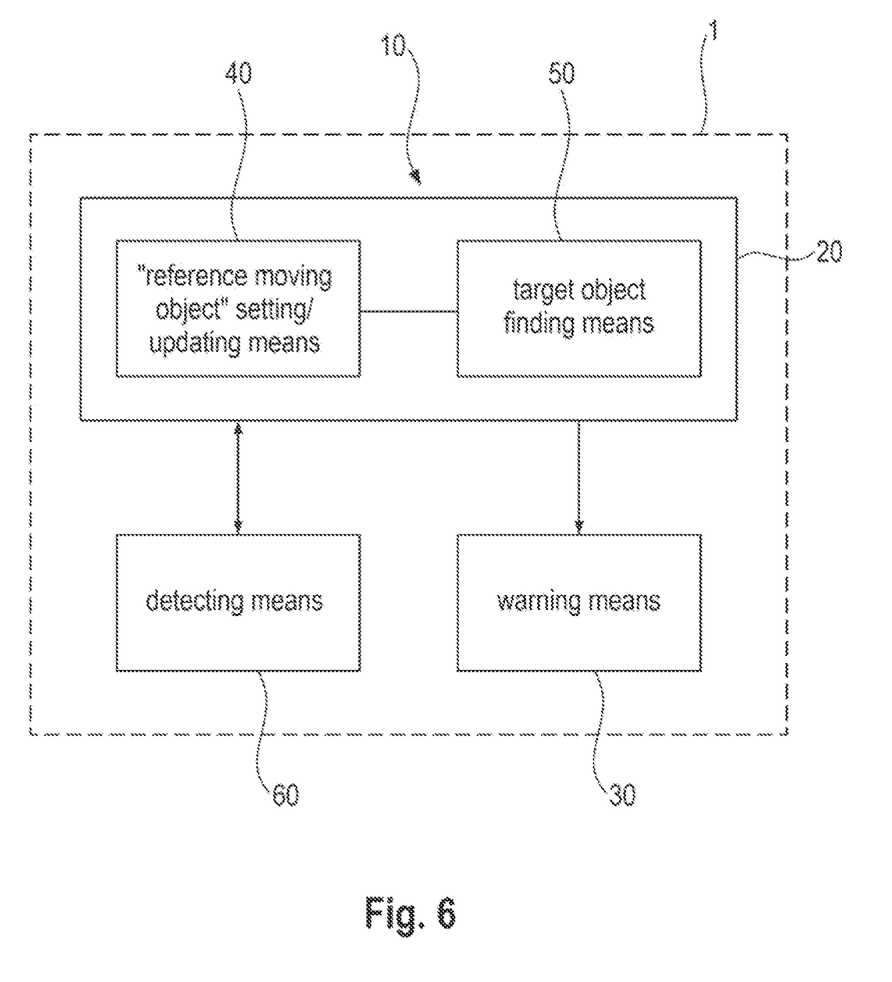
FIG. 6 schematically shows a blind spot detection control apparatus according to the present invention provided in a driver assistance system according to the invention, which are configured to carry out the method according to the invention.

Before the operation of the blind spot detection control apparatus 10 according to the invention provided in the driver assistance system 1 is described in detail in respect of FIGS. 1 to 5, the configuration of the blind spot detection control apparatus 10 according to the invention is described in more detail with respect to FIG. 6.

FIG. 6 schematically shows a blind spot detection control apparatus 10 according to the present invention provided in a driver assistance system 1 according to the invention, which are both configured to carry out the method according to the invention.

The driver assistance system 1 is for a vehicle, like a convention motor vehicle or an autonomous driving vehicle, and comprises detecting means 60, the blind spot detection apparatus 10 according to the present invention and warning means 30.

The detecting means 60 is configured to detect an object, like another vehicle, in a blind spot zone of the ego/subject vehicle during a detection cycle. For example, the detecting means 60 comprises, in this embodiment, short-range-radar sensors for detecting objects like other vehicles in the blind spot zones/areas of the ego/subject vehicle, for example, in blind spot areas being located behind and/or lateral to the ego/subject vehicle in which the driver assistance system 1 is arranged.

The blind spot detection control apparatus 10 comprises judging means 20, wherein the judging means in turn comprises reference moving object setting/updating means 40 and target object finding means 50. All the constituent elements will be described in more detail in connection with FIGS. 1 to 5.

Figure 1:
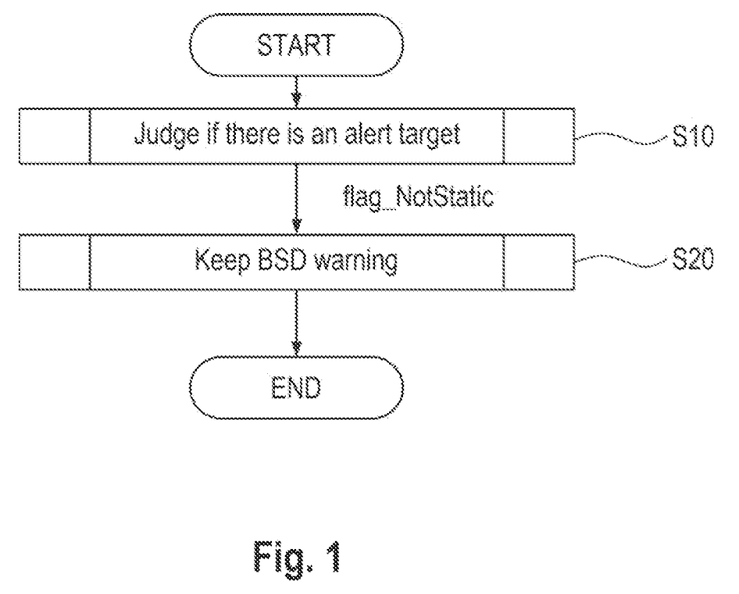
FIG. 1 shows a flowchart of an overall process of the blind spot detection control according to the embodiment of the invention.

FIG. 1 shows a flowchart of an overall process of the blind spot detection control according to the embodiment of the invention, which is carried out by a blind spot detection apparatus 10 and represents a mode of operation of the blind spot detection apparatus 10 according to the invention.

For the description of the operation of the blind spot detection apparatus 10, the following conditions are assumed at first:

The ego/subject vehicle in which the blind spot detection apparatus 10 is arranged moves at a certain pace, for example, drives forward at a certain velocity, and a target object being another vehicle enters a blind spot detection area of the ego vehicle and, therefore, triggers a blind spot detection alarm for the first time by a conventional blind spot detection warning process in this embodiment.

The overall process is not for forcing a blind spot detection warning (BSD warning) to be turned off, but only keeps the BSD warning to be turned on if the respective conditions are matched which will be apparent below.

Accordingly, before the overall process is carried out, a conventional BSD warning process is executed, in which it is determined whether to trigger to blind spot detection alarm or not. As be seen below, even if it is determined not to trigger a BSD warning ("bAlarm" is set to "False") in the conventional BSD warning process, if there is time left on a timer T, a BSD warning will be triggered (i.e. "bAlarm" will be set to True), and output of the BSD warning will be maintained. However, as mentioned above, in this case, it is assumed that a blind spot detection alarm has been triggered in the conventional BSD warning process.

As can be gathered from FIG. 1, when the overall process is started, at first step S10 is carried out, according to which an alert target judging process is carried out by the judging means 20, which process will be described later in connection with FIG. 2.

Subsequently, step S20 is carried out, in which a blind spot detection warning process for keeping the BSD warning on is executed by the warning means 30, which process will be described later in connection with FIG. 3.

As can be further gathered from FIG. 1, the outcome of the alert target judging process carried out in step S10 is a data structure in the form of a flag named as "flag_NotStatic" which can take the two values of "True" and "False". The flag "flag_NotStatic" is used in the blind spot detection warning process as will be seen below and means that, in a previous detection cycle, a target object which is similar to the reference object has been detected ("True") or not ("False").

Figure 2:
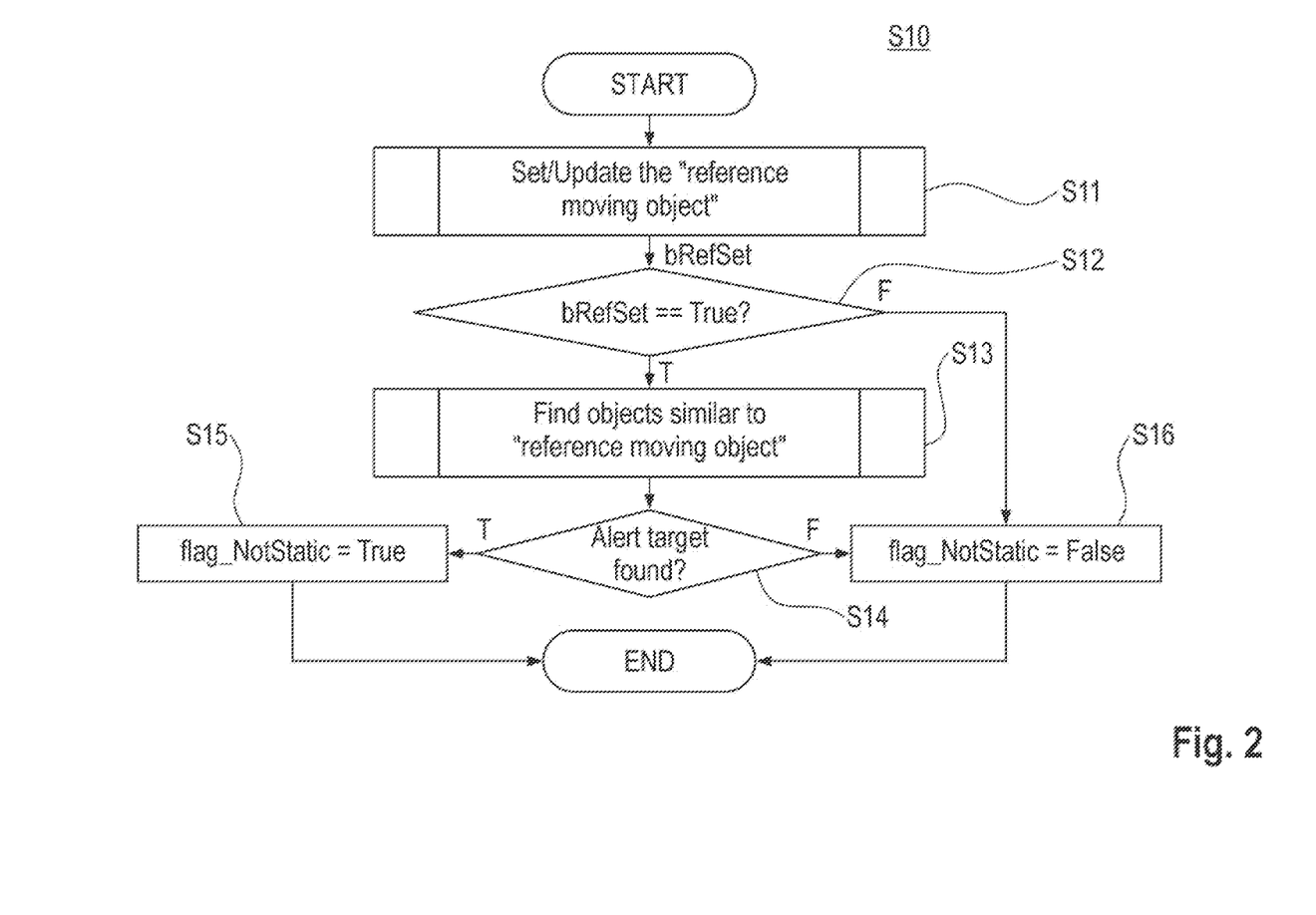
FIG. 2 shows a flowchart of an alert target judging process carried out by the overall process of FIG. 1.

FIG. 2 shows a flowchart of the alert target judging process S10 carried out in the overall process of FIG. 1 by the judging means 20. By means of this process, it is judged if there is an alert target in the blind spot detection zone (BSD zone), which judgement is made by the judging means 20.

When the alert target judging process S10 is started, at first a reference moving object setting or updating process S11 is carried out by the reference moving object setting/updating means 40, which will be described later in connection with FIG. 4. In the reference moving object setting or updating process S11, a "reference moving object" is set/updated or initialized/erased.

As can be further gathered from FIG. 2, the outcome of the reference moving object setting or updating process carried out in S11 is a data structure in the form of a flag named as "bRefSet" which can take the two values of "True" and "False". The flag "bRefSet" is used for indicating whether the reference moving object is set ("True") or not, i.e. initialized/erased ("False"). If the reference moving object is set to "true", a target object has been detected in the BSD zone, if it is set to "false", no target object has been detected in the BSD zone.

In the next step S12, it is judged whether the reference moving object is set or not, i.e whether "bRefSet" is set to "True" or "False".

If it is judged in step S12 that the reference moving object is set (BRefSet==True), the procedure moves to step S13, in which a target object finding process is carried out by target object finding means 50, which will be described further in connection with FIG. 5.

If it is judged in step S12 that the reference moving object is not set, i.e. initialized/erased (BRefSet==False), the procedure moves to step S16, in which the data structure in the form of the flag named as "flag_NotStatic" is set to "False" (flag_NotStatic=False), meaning that no object similar to the reference moving object is found which is the consequence of the fact that no reference moving object has been set ("bRefSet==False"). After step S16, the alert target judging process is ended.

In step S13, the target object finding process is carried out by the target object finding means 50, the outcome of which is whether an alert object has been found or not. Accordingly, in step S13, in case an alert object has been found, the flag "flag_NotStatic" is set to "True" and in the other case that no alert object has been found is set to "False".

In the next step S14, it is judged whether an alert object has been found in step S13. If an alert object has been found, the procedure moves to step S15, where it is confirmed that the flag "flag_NotStatic" is set to "True". If no alert object has been found, the procedure moves to step S16 as described above, where it is confirmed that the flag "flag_NotStatic" is set to "False". The procedure then ends.

Next, the step S11 of FIG. 2, in which the reference moving object setting or updating process is executed will be described further with respect to FIG. 4.

FIG. 4 shows a flowchart of the reference moving object setting or updating process S11 carried out in the alert target judging process of FIG. 2. The reference moving object setting or updating process S11 is carried out by the reference moving object setting/updating means 40 as indicated above.

As can be gathered from FIG. 4, in step S111, it is judged whether the flag "bRefSet" it is set to "True" or not ("False"), meaning whether a reference moving object is set or not.

If it is judged that "bRefSet" it is set to "True", the procedure goes to step S113, in which it is judged whether the reference moving object is inside the blind spot detection zone (BSD zone) which detection is carried out by the detecting means 60.

If it is judged in step S113 that the reference moving object is inside the blind spot detection zone ("True"), the reference moving object setting or updating process S11 is ended and the currently set reference moving object remains.

If it is judged that the reference moving object is not inside the blind spot detection zone ("False"), the procedure goes to step S114.

In step S114, it is judged whether the flag "flag_NotStatic" is set to "True" or not ("False"). If the flag "flag_NotStatic" is set to "True", meaning that a target object similar to the reference moving object was found in a previous detection cycle in the blind spot detection zone, the procedure moves to step S117.

In step S117, the target object detected in the previous detection cycle is set as the new reference moving object and the flag "bRefSet" it is set to "True". In other words, the reference moving object setting/updating means 40 is configured to set a current target object detected in the blind spot zone in a current detection cycle to be the reference moving object if the reference moving object is presently set but is not detected in the blind spot detection zone and the current target object has been judged to be an alert object in a previous detection cycle.

If, however, it is judged in step S114 that the flag "flag_NotStatic" is not set to "True" but to "False", the procedure moves to step S115, meaning that no target object similar to the reference moving object has been found in a previous detection cycle.

In step S115, the following condition is judged:

$$T_{now} - T_{ref\_exit} > T_0$$

in which $T_{now}$ corresponds to the current time, $T_{ref\_exit}$ corresponds to the time when reference moving object exited/disappeared from BSD zone, and $T_0$ corresponds to a threshold time to find new reference moving object.

In other words, if the difference between the point in time $T_{now}$ (which is later than the point in time $T_{ref\_exit}$) and the point in time $T_{ref\_exit}$ exceeds the threshold value $T_0$, meaning that, for example, the object has not been detected for a specific time, the procedure moves to step S116 ("True" in step S115).

In step S116, the reference moving object setting/updating means 40 initializes/erases the setting of the reference moving object if the reference moving object is presently not detected in the blind spot detection zone, no current target object has been judged to be an alert object in a previous detection cycle and a difference between the current time and the time when the reference moving object was detected to have left the blind spot detection zone exceeds a predetermined threshold value.

If the difference between the point in time $T_{now}$ and the point in time $T_{ref\_exit}$ does not exceed the threshold value $T_0$ ("False" in step S115), the reference moving object setting or updating process S11 is ended, that is, for the time being, the reference moving object is maintained as it is.

In other words, the reference moving object setting/updating means 40 maintains the set reference moving object if the reference moving object is presently not detected in the blind spot detection zone, no current target object has been judged to be an alert object in a previous detection cycle and the difference between the current time and the time when the reference moving object was detected to have left the blind spot detection zone is smaller than the predetermined threshold value.

Going back to step S111, if it is judged that the flag "bRefSet" is not set to "True" but "False", the procedure goes to step S112 in which it is judged whether a flag "bAlarm" is set to "True", which flag is a global flag for indicating to turn the blind spots detection warning on if it is set to "True", and to turn off the blind spots detection warning if it is set to "False". In this case, if an object has correctly triggered the blind spot detection alarm in the conventional BSD warning process, "bAlarm" should be set to "True".

If it is judged in step S112 that "bAlarm" is set to "True", the procedure moves to step S117 as described above. In this case, as no reference moving object was set and "bAlarm" is set to "True", the target object which triggered the blind spot detection alarm for the first time is set to the reference moving object.

In other words, the reference moving object setting/updating means 40 is configured to set a current target object detected during a current detection cycle in the blind spot zone to be the reference moving object if no reference moving object is presently set and a trigger for causing the warning means to warn the driver of presence of an object in the blind spot zone is set.

If it is judged in step S112 that "bAlarm" is not set to "True" ("False"), the reference moving object setting or updating process S11 is ended.

Next, the target object finding process S13 is described in connection with FIG. 5 in more concrete terms, which shows a flowchart of a target object finding process S13 carried out in the alert target judging process of FIG. 2 by the target object finding means 50.

When the target object finding process S13 is started, at first, step S131 is carried out, in which it is judged whether the reference moving object is in the blind spot detection zone. If the reference moving object is in the blind spot detection zone ("True" in step S131), the procedure moves to step S132. Otherwise, if the reference moving object is not in the blind spot detection zone ("False" in step S131), the target object finding process S13 is ended.

In step S132, a process for finding a (new) target object in the blind spot detection zone is carried out by the target object finding means 50. In essence, the target object finding means 50 of the judging means 20 compares detection parameters relating to the current target object with the detection parameters relating to the reference moving object on the basis of a difference of position coordinates, with respect to the vehicle, of the target object and the reference moving object and a difference of relative velocities, with respect to the vehicle, of the target object and the reference moving object. In more detail, the target object finding means 50 of the judging means 20 judges the current target object to be an alert object if the comparison of the detection parameters relating to the current target object with the detection parameters relating to the reference moving object satisfy two predetermined conditions with respect to the position coordinates and relative velocities.

In more concrete terms, a (new) target object is determined if the object detected (compared object) fulfills the criteria with respect to a "Position check" and a "Velocity check" (being the above conditions), which criteria are described below in more concrete terms.

Position check:
 $Abs(DistX-DistX_{ref})<DistX\_Thresh$
 $Abs(DistY-DistY_{ref})<DistY\_Thresh$
Velocity Check:
 $Abs(VrelX-VrelX_{ref})<VrelX\_Thresh$
 $Abs(VrelY-VrelY_{ref})<VrelY\_Thresh$ The expressions used for the "Position check" and a "Velocity check" are the following:
 Abs(Value): Absolute value of "Value"
 DistX: X position of the target object with respect to the ego/subject vehicle,
 DistY: Y position of the target object with respect to the ego/subject vehicle,
 $DistX_{ref}$: X position of the reference moving object with respect to the ego/subject vehicle,
 $DistY_{ref}$: Y position of the reference moving object with respect to the ego/subject vehicle,
 VrelX: X relative velocity of the target object with respect to ego/subject vehicle,
 VrelY: Y relative velocity of the target object with respect to ego/subject vehicle,
 $VrelX_{ref}$: X relative velocity of the reference moving object with respect to ego/subject vehicle,
 $VrelY_{ref}$: Y relative velocity of the reference moving object with respect to ego/subject vehicle,
 DistX_Thresh: threshold value for X position difference,
 DistY_Thresh: threshold value for Y position difference,
 VrelX_Thresh: threshold value for X velocity difference,
 VrelY_Thresh: threshold value for Y velocity difference.

If the detected object fulfills the criteria described above, the flag_NotStatic is set to "True", otherwise the Flag_NotStatic is set to false "False". Then, the target object finding process S13 is ended, and the procedure proceeds with step S14 of FIG. 2 as described above.

Figure 3:
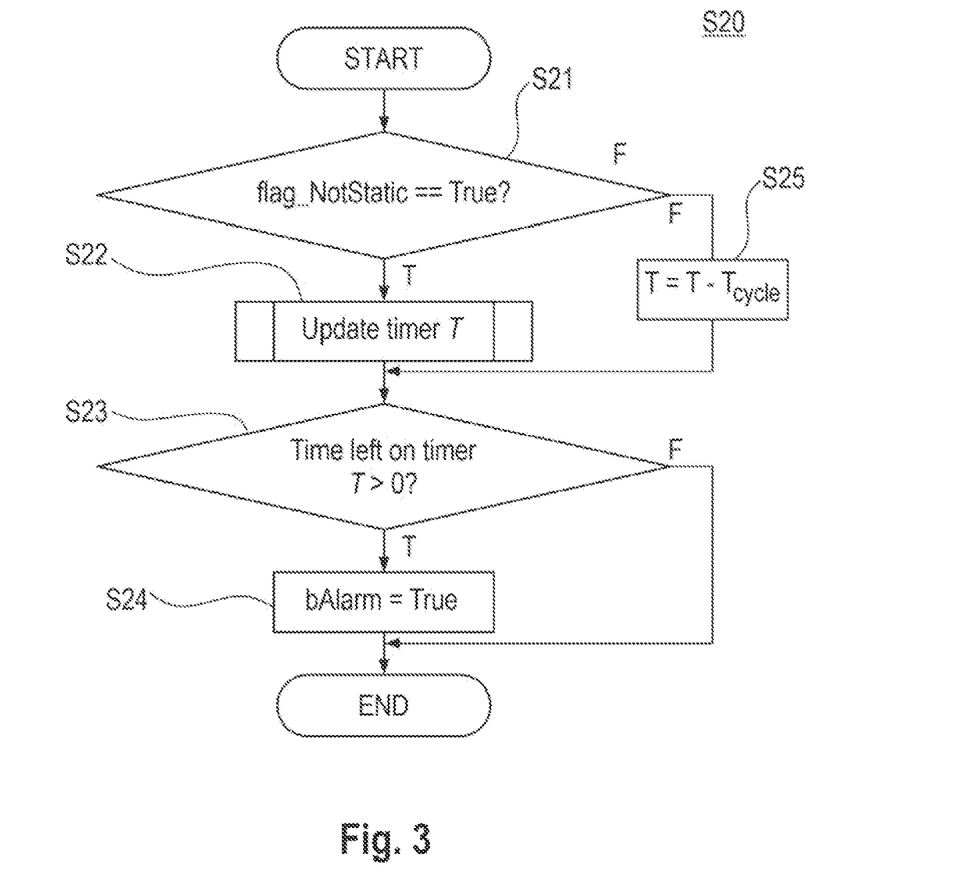
FIG. 3 shows a flowchart of a blind spot detection warning process carried out by the overall process of FIG. 1.

Returning now to FIG. 1 again, after step S10 has been carried out in the overall process, the procedure moves to step S20, in which the blind spot detection warning process is executed by the warning means 30 as shown in FIG. 3, while "flag_NotStatic" is either set to "True" or "False". FIG. 3 shows a flowchart of the blind spot detection warning process S20 carried out in the overall process of FIG. 1 by the warning means 30. The warning means 30 is configured to warn a driver of the vehicle that an object is present in the blind spot zone if the judging means 20 judges that the object detected in the blind spot zone is an alert object and/or keeps a BSD warning to be turned on/maintained as long as a timer T exceeds 0, wherein the timer T is updated on the basis of the function indicated below. In other words, should the conventional BSD warning process turn off the BSD warning, for example, as no target object is detected in the BSD zone/area, the blind spot detection warning process according to the invention sets the BSD warning in any case to be on (bAlarm=True) as long as the timer T exceeds 0.

In other words, when the blind spot detection warning process S20 is started, at first step S21 is executed, in which it is judged whether flag_NotStatic is set to "True" or not ("False"). If flag_NotStatic is set to "True", the procedure moves to step S22, in which a timer T is updated. Otherwise, the procedure moves to step S25, in which timer T is deducted by the time length of a process cycle $T_{cycle}$, i.e. according to the following equation: $T=T-T_{cycle}$, and proceeds to step S23. In other words, if no alert object is detected (if flag_NotStatic==False), the timer T is deducted by the time length of a process cycle $T_{cycle}$, i.e. according to the equation $T=T-T_{cycle}$.

In step S22, a timer T update function is carried out, as follows:

$$T=\text{MIN}(T_{MAX},\text{MAX}(T,TTC))-T_{cycle}$$

The following expression are used in the above timer updated function:
TTC: time until object exits warning zone
T: Timer length,
$T_{MAX}$: Maximum threshold for timer length,
$T_{cycle}$: Time length of a process cycle
Regarding the function $T=\text{MIN}(T_{MAX}, \text{MAX}(T, TTC))-T_{cycle}$, the following applies:
Step 1: MAX(T, TTC) will return T if T>TTC and return TTC if T<TTC. As a consequence of this, the timer will be prolonged if a longer TTC is detected;
Step 2: $T=\text{MIN}(T_{max}, \text{MAX}(T, TTC))$ will return $T_{max}$ if $T_{max}$<MAX(T, TTC) and return MAX(T, TTC) if $T_{max}$>MAX(T, TTC). Accordingly, the timer length is kept shorter than $T_{max}$, which is to reduce the risk of long False BSD warnings.
Step 3: $T=T-T_{cycle}$ will be calculated, so that the timer will act as a timer. This calculation will be executed regardless of the fact whether an alert target has been detected or not (regardless of the setting of the "flag_NotStatic==False" or "flag_NotStatic==True"). After the timer T has been updated, the procedure moves to step S23, in which it is judged whether the time left on the timer T is greater than 0 or not. If T is greater than 0, the procedure moves to step S24, in which bAlarm is set to "True", indicating to either turn the blind spot detection warning on or to keep it turned on in case the conventional BSD warning process turned the blind spot detection warning off (bAlarm was set to "False") in case no target object has currently been detected. Otherwise, the procedure skips step S24 and the blind spot detection warning process S20 is ended.

Returning to FIG. 1 again, after step S20 is executed, the overall process ends, and is executed again in a specified cycle.

The features of the invention disclosed in the foregoing description, in the drawings as well as in the claims may be essential for the realization of the invention both individually and in any combination.

The invention claimed is:

1. A blind spot detection control apparatus (10) for using with a vehicle, comprising:
   judging means (20) for judging whether an object detected during a detection cycle in a blind spot zone of the vehicle is an alert object, and for outputting a result of judgement to warning means (30) which triggers a warning to a driver of the vehicle based on the judging means (20) judging that the object detected in the blind spot zone is an alert object,
   wherein the judging means (20) is configured to judge whether the object detected in the blind spot zone is an alert object by comparing detection parameters relating to a current target object detected in the blind spot zone during a current detection cycle corresponding to the object detected in the blind spot zone with detection parameters relating to a reference moving object corresponding to a target object detected in the blind spot zone at least during a previous detection cycle; and
   wherein the warning means (30) is configured, when the warning has been triggered, to continue to output the warning as long as the reference moving object is retained in the blind spot zone and the target object is found to be similar to the reference moving object.

2. The blind spot detection control apparatus (10) according to claim 1, wherein the judging means (20) is configured to compare the detection parameters relating to the current target object with the detection parameters relating to the reference moving object based on at least one of a difference of position coordinates, with respect to the vehicle, of the current target object and the reference moving object or a difference of relative velocities, with respect to the vehicle, of the current target object and the reference moving object.

3. The blind spot detection control apparatus (10) according to claim 2, wherein the judging means (20) is configured to judge the current target object to be the alert object based on the comparison of the detection parameters relating to the current target object with the detection parameters relating to the reference moving object satisfying one or more predetermined conditions with respect to the position coordinates or relative velocities.

4. The blind spot detection control apparatus (10) according to claim 3, wherein the judging means (20) is configured to judge the current target object to be the alert object based on the following conditions being satisfied:
   Abs(DistX−DistXref)<DistX_Thresh,
   Abs(DistY−DistYref)<DistY_Thresh,
   Abs(VrelX−VrelXref)<VrelX_Thresh,
   Abs(VrelY−VrelYref)<VrelY_Thresh,
   where
   DistX is X position of the current target object with respect to the vehicle,
   DistY is Y position of the current target object with respect to the vehicle,
   DistXref is X position of the reference moving object with respect to the vehicle,
   DistYref is Y position of the reference moving object with respect to the vehicle,
   VrelX is X relative velocity of the current target object with respect to vehicle,
   VrelY is Y relative velocity of the current target object with respect to vehicle,
   VrelXref is X relative velocity of the reference moving object with respect to vehicle,
   VrelYref is Y relative velocity of the reference moving object with respect to vehicle,
   DistX_Thersh is threshold value for X position difference,
   DistY_Thersh is threshold value for Y position difference,
   VrelX_Thersh is threshold value for X velocity difference,
   VrelY_Thersh is threshold value for Y velocity difference.

5. The blind spot detection control apparatus (10) according to claim 1, further comprising
   reference moving object setting/updating means (40) configured to at least one of
   set the current target object detected during the current detection cycle in the blind spot zone to be the reference moving object based on no reference moving object being presently set and a trigger for causing the warning means to warn the driver being set, set the current target object detected in the blind spot zone in the current detection cycle to be the reference moving object based on the reference moving object being presently set but being not detected in the blind spot detection zone and the current target object having been judged to be an alert object in a previous detection cycle, initialize the setting of the reference moving object based on the reference moving object being presently not detected in the blind spot detection zone, no current target object having been judged to be an alert object in a previous detection cycle and a difference between the current time and the time when the reference moving object was detected to have left the blind spot detection zone exceeding a predetermined threshold value.

6. The blind spot detection control apparatus (10) according to claim 5, wherein the reference moving object setting/updating means (40) is configured to maintain the set reference moving object based on the reference moving object being presently not detected in the blind spot detection zone, no current target object having been judged to be an alert object in a previous detection cycle and the difference between the current time and the time when the reference moving object was detected to have left the blind spot detection zone being smaller than the predetermined threshold value.

7. A driver assistance system (1) for a vehicle, comprising the blind spot detection apparatus (10) according to claim 1, detecting means (60) for detecting the object in the blind spot zone of the vehicle during a detection cycle, and the warning means (30) for warning the driver of the vehicle that the object detected in the blind spot zone is present based on the judging means (20) of the blind spot detection apparatus (10) judging that the object detected in the blind spot zone is an alert object.

8. The driver assistance system (1) according to claim 7, wherein the warning means (30) is configured to at least one of warn the driver of the vehicle that the object detected in the blind spot zone is present based on the judging means (20) judging that the object detected in the blind spot zone is an alert object or keep a warning to be maintained as long as a timer T exceeds 0, wherein the timer T is updated on the basis of the following function:

$$T = \text{MIN}(TMAX, \text{MAX}(T, TTC)) - Tcycle$$

where:
TTC is the time until the object detected in the blind spot zone exits a warning zone
T is the timer length,
TMAX is the maximum threshold for timer length, and
Tcycle is the time length of a detection cycle.

9. A computer-implemented method for controlling blind spot detection of a vehicle, the method comprising:

judging whether an object detected in a blind spot zone of the vehicle during a detection cycle is an alert object, and outputting a result of judgement for warning a driver of the vehicle that the object detected in the blind spot zone is present based on judging that the object detected in the blind spot zone is an alert object, wherein it is judged whether the object detected in the blind spot zone is an alert object by comparing detection parameters relating to a current target object detected in the blind spot zone during a current detection cycle with detection parameters relating to a reference moving object corresponding to a target object detected in the blind spot zone at least during a previous detection cycle.

10. A computer-readable medium having stored thereon a computer program comprising instructions which, when the program is executed by a computer, cause the computer to carry out the computer-implemented method of claim 9.

* * * * *